United States Patent [19]
Kitamine et al.

[11] Patent Number: 5,998,884
[45] Date of Patent: Dec. 7, 1999

[54] DRIVING SYSTEM FOR ELECTRIC VEHICLES HAVING A PLURALITY OF BATTERIES

[75] Inventors: Yasukazu Kitamine, Kariya; Satoru Kodama, Obu, both of Japan

[73] Assignee: Denso Corporation, Kariya, Japan

[21] Appl. No.: 09/138,538

[22] Filed: Aug. 24, 1998

[30] Foreign Application Priority Data

Oct. 24, 1997 [JP] Japan ................................ 9-292859

[51] Int. Cl.$^6$ ................................................. B60K 1/00
[52] U.S. Cl. ........................................ 307/10.1; 180/65.8
[58] Field of Search ............................ 307/10.1, 89, 91; 180/65.1, 65.4, 65.8; 318/139, 560; 701/22; 439/607–610

[56] References Cited

U.S. PATENT DOCUMENTS

| | | |
|---|---|---|
| 5,527,637 | 6/1996 | Nakazawa et al. . |
| 5,583,751 | 12/1996 | Nakazawa et al. . |
| 5,619,107 | 4/1997 | Shinohara et al. ................ 318/139 |
| 5,698,905 | 12/1997 | Rüthlein et al. ................... 180/65.4 |
| 5,796,175 | 8/1998 | Iton et al. ......................... 307/10.1 |
| 5,883,481 | 3/1999 | Ito et al. ........................... 318/560 |

FOREIGN PATENT DOCUMENTS

| | | |
|---|---|---|
| 54-9763 | 4/1979 | Japan . |
| 5-064308 | 3/1993 | Japan . |
| 9-046921 | 2/1997 | Japan . |

Primary Examiner—Richard T. Elms
Attorney, Agent, or Firm—Pillsbury Madison & Sutro LLP

[57] ABSTRACT

In a driving system for vehicles having a high voltage main battery for a vehicle drive motor and a low voltage accessory battery for accessory devices such as a radio receiver, a three-phase inverter circuit for driving the vehicle drive motor and a DC-DC converter are connected to the main battery through electromagnetically shielded high voltage power lines. The DC-DC converter supplies a low voltage electric power to a driver circuit for switching on and off the inverter circuit. Switching noise voltages caused by switching operations in the inverter circuit, the driver circuit and the DC-DC converter are restricted from being superimposed on low voltage power lines connecting the accessory battery to the accessory devices.

6 Claims, 3 Drawing Sheets

DRIVING SYSTEM FOR ELECTRIC VEHICLES HAVING A PLURALITY OF BATTERIES

CROSS REFERENCE TO RELATED APPLICATION

This application relates to and incorporates herein by reference Japanese Patent application No. 9-292859 filed on Oct. 24, 1997.

BACKGROUND OF THE INVENTION

The present invention relates to a driving system for electric vehicles and, more particularly, to a driving system for electric vehicles having a plurality of batteries.

In a conventional hybrid-type electric vehicle, an internal combustion engine drives an electric power generator which in turn supplies electric power to both of a main battery of high voltage (e.g., 300 V) and a vehicle drive motor. The main battery (high voltage battery) supplies the electric power to a starter motor which in turn starts the internal combustion engine. This starter motor may use the above electric power generator for engine starting.

In JP 54-9763, an accessory battery (low voltage battery) supplies electric power to an electronic control circuit which includes a microcomputer and a logic interface. The control circuit controls a three-phase inverter circuit for driving a vehicle drive motor.

In such an electric vehicle driving system having the accessory battery, the vehicle drive motor can be driven by a higher voltage power than other normal accessory devices. Thus, it is advantageous that the drive motor can be operated with less loss of electric power and its drive unit can be reduced in size, while vehicle accessory devices can be operated by the lower voltage power which has less voltage fluctuation.

In the above electric vehicle driving system having a plurality of batteries, the accessory battery also supplies the electric power to a driver circuit which switches on and off the switching devices in the three-phase inverter circuit for controlling the vehicle drive motor. It is therefore proposed to connect an input-output isolating type DC-DC converter between the accessory battery and the power supply terminals of the driver circuit, and to connect photo couplers between the control circuit and the control terminals of switching devices of the driver circuit.

As shown in FIG. 3 in more detail, the electric vehicle driving system having the accessory battery comprises a main battery 1, an accessory battery 2, an electronic driver circuit unit 3, and a vehicle drive motor 4. The driver circuit unit 3 includes a three-phase inverter circuit 31, a photo coupler circuit 32, a control circuit (CC) 33, a driver circuit power source 34 and a relay 35.

The three-phase inverter circuit 31 includes insulated-gate bipolar transistors (IGBTS) 3a–3f, diodes (not shown) connected in parallel and in opposite polarity with the IGBTs 3a–3f, and gate control circuit (not shown) which controls IGBTs 3a–3f. The gate control circuit thus constitutes together with the photo coupler circuit 32 a driver circuit for the three-phase inverter circuit 31.

The photo coupler circuit 32 includes photo couplers 32a–32c which switch on and off IGBTs 3a–3c respectively, and photo couplers 32d–32f which switch on and off IGBTs 3d–3f respectively. The IGBTs 3a–3c are used as high voltage side switches, while IGBTs 3d–3f are used as low voltage side switches.

The driver circuit power source 34 is a switching-type voltage-reducing DC-DC converter which includes a transformer 340 and rectifier circuits 34a–34d. The rectifier circuits 34a–34c supply voltages to the gates of the IGBTs 3a–3c through photo couplers 32a–32c, respectively. The rectifier circuit 34d supplies a voltage to the gates of the IGBTs 3d–3f through photo couplers 32d–32f.

A switching transistor 36 is connected between the control circuit 33 and the transformer 34. The control circuit 33 switches on and off the switching transistor 36 at a fixed frequency to apply an alternating current (AC) voltage to the primary winding of the transformer 340.

In the above system, a pair of high voltage side power lines 5 supply high voltage electric power from the main battery 1 to the driver circuit unit 3, while a pair of low voltage side power lines 7 supply low voltage electric power from the accessory battery 2 to the driver circuit unit 3. Three motor driving power lines 6 connect the driver circuit unit 3 to the vehicle driver motor 4. Both of the high voltage power supply lines 5 and the motor driving power lines 6 are shielded-type to reduce radio noise.

This system has the following disadvantages.

The vehicle drive motor 4 has a large reactance. When the IGBTs 3a–3f in the three-phase inverter circuit 3 turn on and off repeatedly, this reactance will cause large switching noise voltages to be imposed on the low voltage power lines 7 of the accessory battery 2 from the control terminals of the IGBTs 3a–3d through the driver circuit power source 34.

The driver circuit turns on and off repeatedly to drive the IGBTs 3a–3f by receiving the electric power from the driver circuit power source 34 and power-amplifying signals from the photo coupler circuit 32. This switching operation also cause large switching noise voltages to be superimposed on the low voltage power lines 7 of the accessory battery 2 through the driver circuit power source 34.

The driver circuit power source 34 which is the switching-type voltage-reducing DC-DC converter requires a periodic switching of the switching transistor 36. Further, the output voltage of the driver circuit power source 34 includes ripples. As a result, the potential of the low voltage power lines 7 for supplying the electric power to the driver circuit power source 34 fluctuate periodically, causing switching noises to be superimposed on the low voltage power lines 7 in the similar manner as the switching noises caused by the IGBTs 3a–3f of the three-phase inverter circuit 31.

In the control circuit 33, its high power driving transistors providing an output interface circuit in particular turns on and off repeatedly. This causes fluctuation in the potential of the low voltage power lines 7 which supplies the electric power to the control circuit 33, resulting in the similar noise problem as well.

It is likely that the above various switching noise voltages superimposed on the low voltage power lines 7 cause other electronic circuits and electronic devices connected to the low voltage power line 7, and that the voltage fluctuation of the low voltage power lines 7 shorten the longevity of the accessory battery 2. Thus, the low voltage power lines 7 must be electromagnetically shielded to suppress generation of radio noises from the low voltage power lines 7.

When the accessory battery 2 runs down because of long non-use, electric power supply from the accessory battery 2 to the control circuit 33, driver circuit power source (switching-type voltage-reducing DC-DC converter) 34 and the driver circuit is disabled. Thus, it may occur that the vehicle drive motor 4 is disabled to operate even under the condition that the main battery 1 still has a sufficient electric power for the vehicle drive motor 4.

SUMMARY OF THE INVENTION

It is therefore an object of the invention to improve a driving system for electric vehicles having a plurality of batteries including a main battery and an accessory battery.

It is a further object of the present invention to reduce switching noise voltages superimposed on low voltage power lines at an accessory battery side in a driving system for vehicles.

It is a still further object of the present invention to enable a vehicle drive motor operation even when an accessory battery runs down in a driving system for vehicles.

According to the present invention, a high voltage main battery supplies its electric power to a driver circuit for controlling switching operation of an inverter circuit for a vehicle drive motor as well as to the inverter circuit and the vehicle drive motor. This reduces switching noise voltages caused by switching operations in the driver circuit and in the inverter circuit from being superimposed on low voltage power lines which connects a low voltage accessory battery and accessory devices such as a radio receiver. Thus, the noise voltages will not shorten the longevity of the accessory battery. Further, even when the accessory battery runs down, the vehicle drive motor may be operated by only the main battery.

Preferably, the high voltage power lines are shielded electromagnetically, while the low voltage power lines need not be shielded electromagnetically.

Preferably, a switching-type voltage-reducing DC-DC converter is used to reduce the high voltage of the main battery to a lower voltage to be supplied to the driver circuit.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
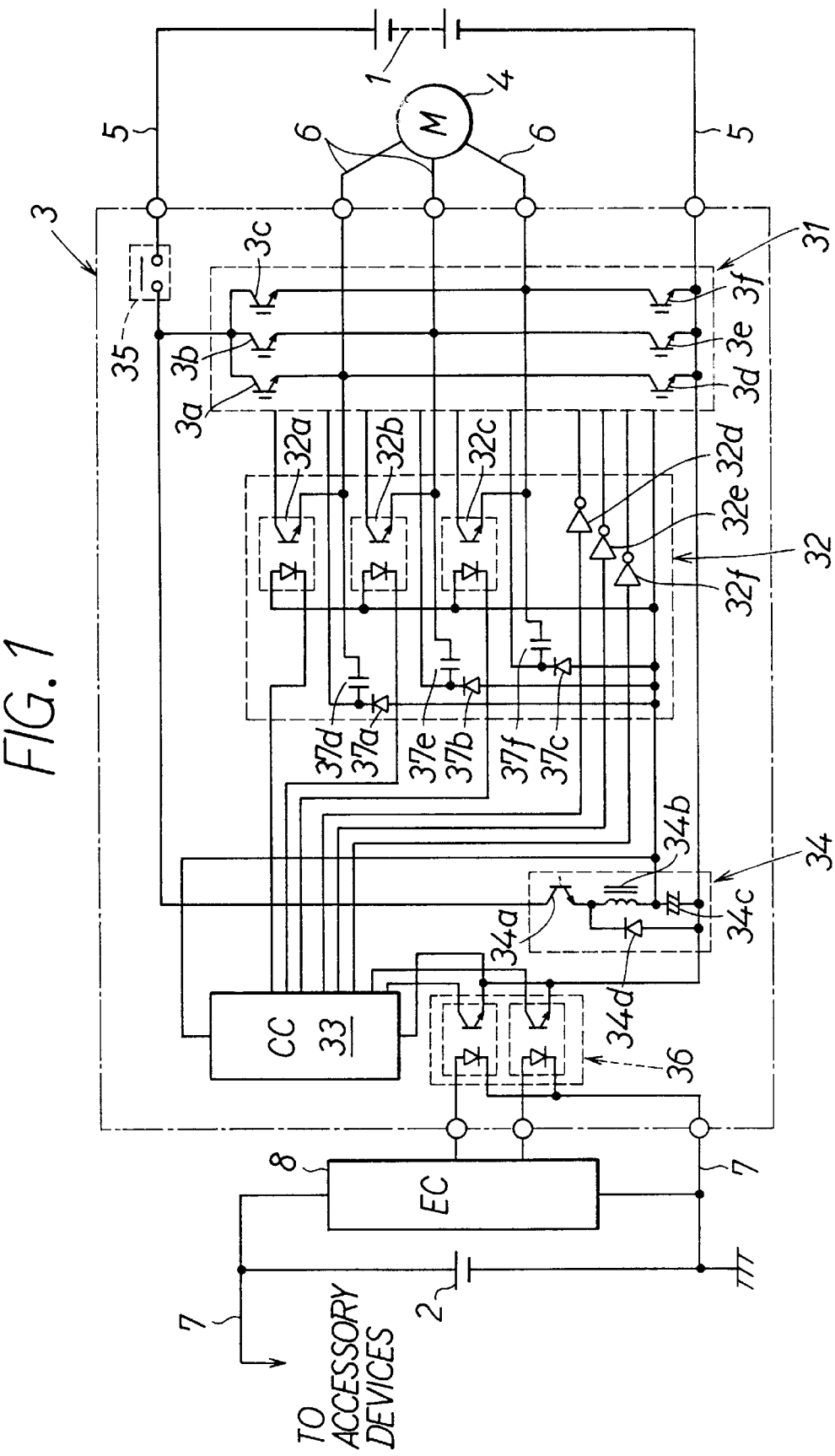
FIG. 1 is an electric circuit diagram showing a driving system for electric vehicles according to the present invention.
Figure 3:
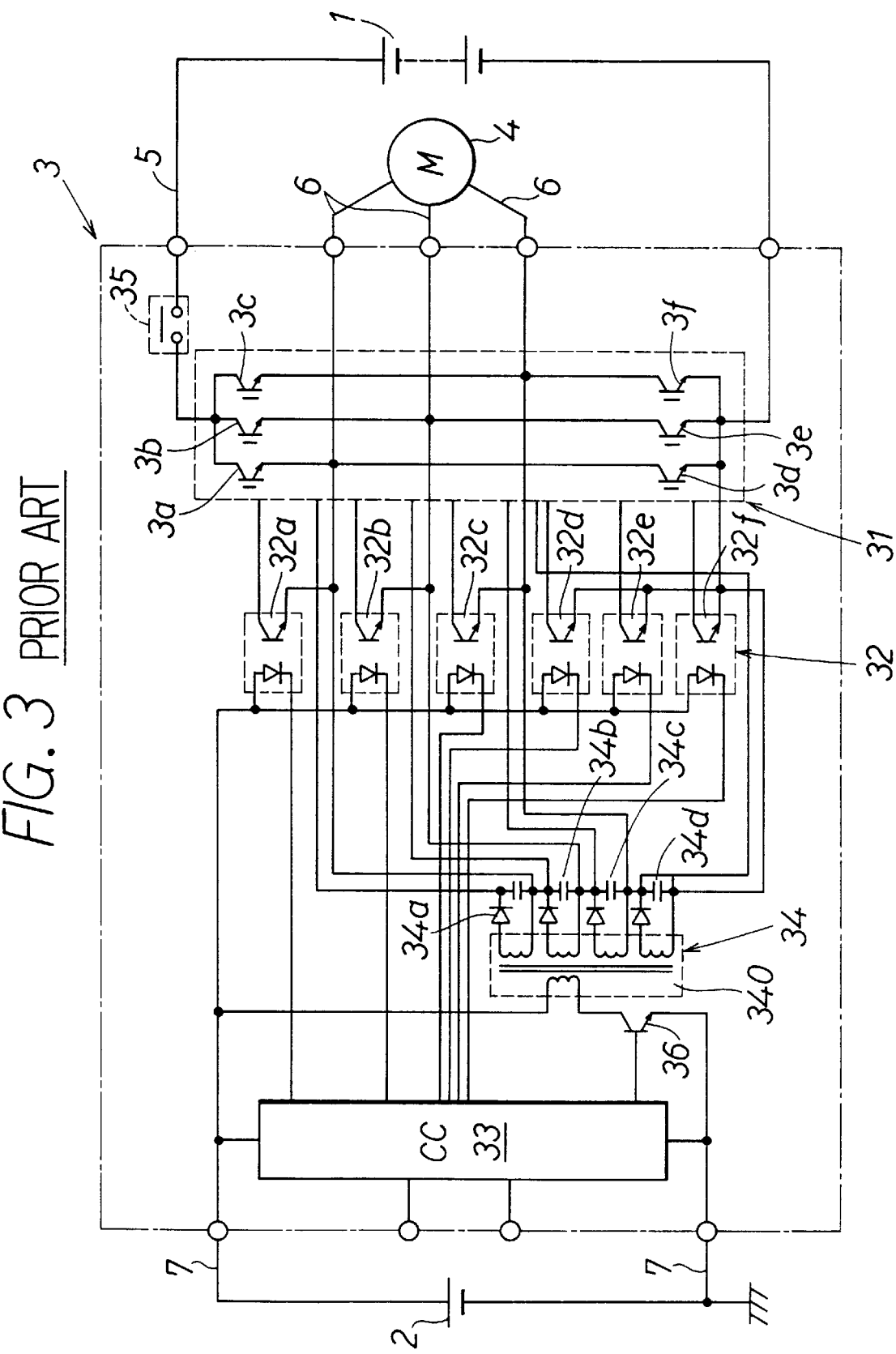
FIG. 3 is an electric circuit diagram showing a conventional driving system for electric vehicles.

A driving system for electric vehicles according to an embodiment of the present invention shown in FIG. 1 has a similar construction as that shown in FIG. 3. That is, it comprises a main battery 1, an accessory battery 2, an electronic driver circuit unit 3, and a vehicle drive motor 4. The driving system further comprises an external controller 8 connected to the accessory battery 8. The driver circuit unit 3 includes a three-phase inverter circuit 31, a photo coupler circuit 32, a control circuit (CC) 33, a driver circuit power source 34 and a relay 35. In this embodiment, the driver circuit unit 3 includes an interface circuit 36 which is connected to the external controller 8.

In this embodiment also, a pair of high voltage side power lines 5 supply high voltage electric power from the main battery 1 to the driver circuit unit 3, while a pair of low voltage side power lines 7 supply low voltage electric power from the accessory battery 2 to the driver circuit unit 3. Three motor driving power lines 6 connect the driver circuit unit 3 to the vehicle driver motor 4. Both of the high voltage power supply lines 5 and the motor driving power lines 6 are shielded-type to reduce radio noises.

The photo coupler circuit 32 includes photo couplers 32a–32c which switch on and off IGBTs 3a–3c respectively. The photo couplers 32a–32c are connected to diodes 37a–37c and capacitors 37d–37e, respectively. The photo coupler circuit 32 in this embodiment includes inverter circuits 32d–32f which switch on and off IGBTs 3d–3f respectively. The IGBTs 3a–3c are used as high voltage side switches, while IGBTS 3d–3f are used as low voltage side switches.

The driver circuit power source 34 is a switching-type voltage-reducing DC-DC converter which includes a series circuit of a switching transistor 34a, a reactor 34b, a capacitor 34c having a large-capacitance. This series circuit is connected to the main battery 1. The driver circuit power source 34 further includes a flywheel diode 34d connected in parallel with the reactor 34b and the capacitor 34c. The switching transistor 34a is switched on and off at a fixed frequency by a built-in multivibrator (not shown).

The interface circuit 36 is an input-output isolating-type and includes a pair of photo couplers 36a, 36b which transmits output signals of the external controller 8 to the control circuit 33 by electrically isolating input and output thereof.

The control circuit 33 executes various control processing which include controlling timings of driving the IGBTs 3a–3f and controlling torque or rotational speed of the vehicle drive motor 4.

In operation, when the relay 35 is turned on, the electric power is supplied from the main battery 1 to the driver circuit power source 34 and the three-phase inverter circuit 31.

The driver circuit voltage source 34 generates a low control voltage across the capacitor 34c by switching on and off the switching transistor 34a. This control voltage is regulated to about 12 V–15 V suitable for the control circuit 33. Alternating current voltages may be superimposed on the high voltage power lines 5 due to the switching operation of the transistor 34a. However, as the high voltage power lines 5 are electromagnetically shielded, electromagnetic noises will not be radiated externally.

With this voltage from the driver circuit power source 34, the control circuit 33 receives a start signal from the external circuit 8 through the interface circuit 36 and produces responsively six kinds of timing signals. Of the six timing signals, three timing signals are for the high side switches (IGBTs 3a–3c) in three-phase mode and other three timing signals are for the low side switches (IGBTs 3d–3f) in three-phase mode. That is, those timing signals turn on and off the corresponding IGBTs 3a–3f in the three-phase inverter circuit 31 through the driver circuit comprising the photo coupler circuit 32 and the gate control circuit in the three-phase inverter circuit 31. Thus, the vehicle drive motor 4 is rotated by three-phase alternating current voltages supplied through the motor power lines 6.

It is to be understood that photo couplers are not necessary for driving the IGBTs 3d–3f, because the IGBTs 3d–3f are used as the low side switches and the emitters thereof are connected to the low voltage side of the main battery 1. It is only necessary that the inverter circuits 32d–32f power-amplifies the three timing signals from the control circuit 33 to be applied to gates of the IGBTs 3d–3f, respectively.

Figure 2:
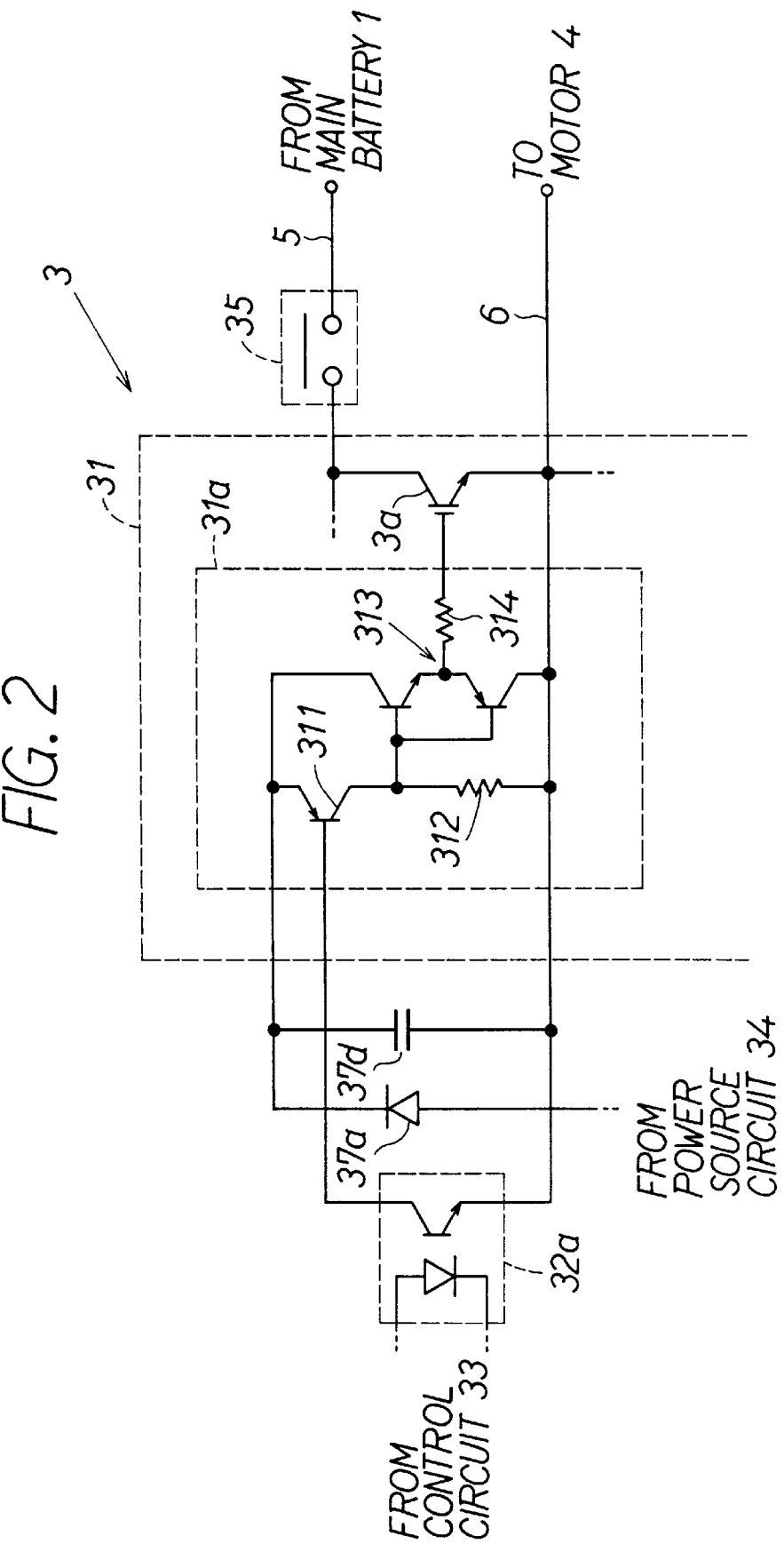
FIG. 2 is an electric circuit diagram of a driver circuit for driving an IGBT in a three-phase inverter circuit used in the driving system shown in FIG. 1.

The driver circuit is built in the three-phase inverter circuit 31 for controlling the IGBTs 3a–3c used as the high side switches. For instance, as shown in FIG. 2, the driver circuit for the IGBT 3*a* is constructed so that the capacitor 37*d* is charged by the driver circuit power source 34 through the diode 37*a*. The capacitor 37*d* supplies a voltage across an inverter circuit comprising a series circuit of emitter-grounded PNP-transistor 311 and its load resistor 312. This inverter circuit in turn controls the gate of the IGBT 3*a* through a complementary emitter-follower buffer circuit 313 and a gate resistor 314.

When the transistor 311 is turned on in response to the signal from the photo coupler 32*a*, the gate potential of the IGBT 3*a* increases to turn on the IGBT 3*a*. When the transistor 311 is turned off by the photo coupler 32*a*, on the other hand, the gate potential of the IGBT 3*a* decreases to turn off the IGBT 3*a*. As the high voltage side potential of the capacitor 37*d* varies with changes in the emitter potential of the IGBT 3*a*, the driver circuit comprising the photo coupler 32*a* and the gate control circuit 31*a* is enabled to the IGBT 3*a* at the high side stably. Other IGBTs 3*b*, 3*c* at the high side can be controlled in the same manner as the IGBT 3*a*.

According to this embodiment, as the driver circuit is supplied with the electric power from the main battery 5 through the driver circuit power source 34, switching noises caused by the switching operation of the IGBTs 3*a*–3*f* will not be superimposed on the low voltage power lines 7. Switching noises caused by the switching operation of the driver circuit will not be superimposed on the low voltage power lines 7 through the driver circuit power source circuit 34. Switching noises caused by the switching operation of the transistor 34 will not be superimposed on the low voltage power lines 7 either. As the control circuit 33 is also supplied with the electric power from the main battery 1 through the driver circuit power source 34, switching noises caused by the control circuit 33 will not be superimposed on the low voltage power lines 7. As a result, even if not shielded electromagnetically, the low voltage power lines 7 are enabled to supply the electric power of the accessory battery 2 to various electronic circuits and devices without increasing radio noises.

Even under the condition that the accessory battery 2 runs down because of battery failure or long non-use of the vehicle drive motor, the driving system can be operated with the main battery 1 which supplies the electric power to the control circuit 33, driver circuit, the driver circuit power source 34 and the like necessary for driving the three-phase inverter circuit 31. This is particularly so when the external device 8 is supplied with the electric power from the driver circuit power source 34.

The above embodiment is not restrictive but may be modified further without departing from the spirit of the present invention.

We claim:

1. A driving system for electric vehicles having a vehicle drive motor and accessory devices comprising:

a main battery for supplying the vehicle drive motor with an electric power through high voltage power lines;

an accessory battery for supplying the accessory devices with an electric power which has a lower voltage than the electric power of the main battery through low voltage power lines;

a three-phase inverter circuit including switching devices and connected to receive the electric power from the main battery and to supply three-phase alternating current voltages to the vehicle drive motor; and a driver circuit for switching on and off the switching devices of the three-phase inverter circuit, the driver circuit being connected to receive the electric power of the main battery.

2. The driving system as in claim 1, wherein:

the high voltage power lines are shielded electromagnetically, and the low voltage power lines are not shielded electromagnetically.

3. The driving system as in claim 1, further comprising:

a switching-type voltage-reducing DC-DC converter for converting a voltage of the electric power of the main battery to a lower voltage to be supplied to the driver circuit.

4. The driving system as in claim 3, further comprising:

a control circuit connected to receive the electric power from the DC-DC converter for generating timing signals which control the driver circuit.

5. The driving system as in claim 4, further comprising:

an interface circuit including photo couplers connecting the control circuit to an external circuit connected to the accessory battery, the photo couplers being for electrically isolating an input side and an output side thereof.

6. The driving system as in claim 1, wherein:

the switching devices are divided into high side devices and low side devices which are connected to a high voltage side and a low voltage side of the main battery, respectively; and the driver circuit includes photo couplers only for the high side devices.

* * * * *